Figure 2:
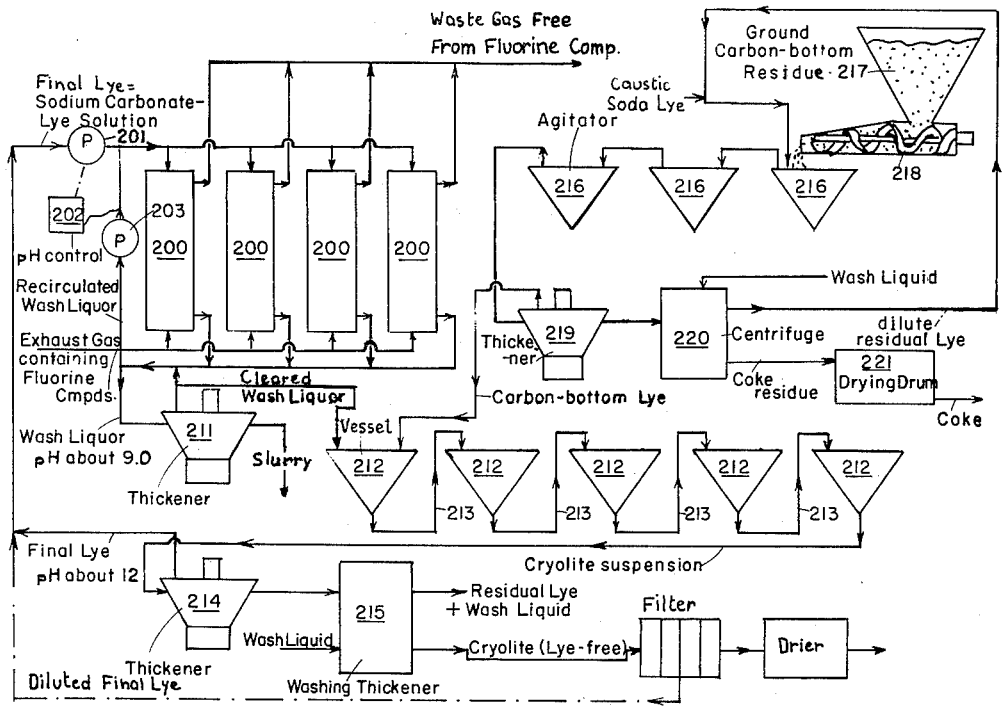

Nov. 20, 1962  H. MADER  3,065,051
PROCESS FOR THE RECOVERY OF CRYOLITE FROM WASTE GASES
AND FROM THE CARBON BOTTOM OF AN ALUMINUM
ELECTROLYTIC FURNACE
Filed Aug. 24, 1960

INVENTOR:
Herbert Mader

BY

AGENT.

United States Patent Office 3,065,051
Patented Nov. 20, 1962

3,065,051
PROCESS FOR THE RECOVERY OF CRYOLITE FROM WASTE GASES AND FROM THE CARBON BOTTOM OF AN ALUMINUM ELECTROLYTIC FURNACE
Herbert Mader, Upper Austria, Austria, assignor to Vereinigte Metallwerke Ranshofen-Berndorf Aktiengesellschaft, Upper Austria, Austria, a corporation of Upper Austria
Filed Aug. 24, 1960, Ser. No. 51,687
9 Claims. (Cl. 23—88)

The instant invention is directed to a novel process for recovering cryolite from waste gases and from the carbon bottom of an aluminum electrolytic furnace.

The losses of fluorine which occur during the fusion electrolysis of aluminum derive, as is known, from the fact that on the one hand some cryolite is decomposed both electrolytically and thermally and volatizes in the form of gaseous fluorine compounds, and on the other hand porous carbon bricks of the furnace bottom absorb considerable amounts of fused cryolite which, after the furnace bottom is exhausted, is cleared away and is lost. In order to avoid losses arising this way, different recovery processes have been developed during the course of time and have been used in the electrolytic aluminum practice.

The processes for recovering fluorine from the waste gases of aluminum electrolytic furnaces depend essentially on the washing of the gases with dilute sodium carbonate solution and on the conversion of the sodium fluoride resulting in accordance with the equation $$Na_2CO_3 + 2HF \rightarrow 2NaF + CO_2 + H_2O \qquad (1)$$

into cryolite ($Na_3AlF_6$) by any of the known methods. The sodium carbonate solution is circulated in the absorption equipment until it becomes converted, as per Equation 1, into sodium fluoride so that, on the one hand, the alkalinity of the sodium carbonate solution is exploited as far as possible and, on the other hand, a sodium fluoride solution of relatively high concentration (30 to 35 grams per liter) is obtained.

The cryolite contained in the carbon bottom, however, is subjected in a crushed condition to treatment with dilute caustic soda lye whereupon sodium fluoride and a sodium aluminate liquor are obtained. The sodium fluoride and the sodium aluminate liquor are mixed with the necessary amount of sodium fluoride solution from the waste-gas washing. According to current knowledge a surplus of about 30% fluoride ions in relation to the aluminum ions present is required for the precipitation of cryolite. From the resulting mixture cryolite is precipitated by neutralizing the free alkali. The precipitation is accomplished, as is known, by the addition of carbon dioxide or sodium bicarbonate to said mixture, whereby cryolite is produced in accordance with one of the following equations:

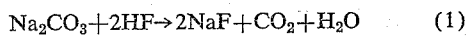
$$NaAlO_2 + 6NaF + 2CO_2 \rightarrow Na_3AlF_6\downarrow + 2Na_2CO_3 \qquad (2)$$
or
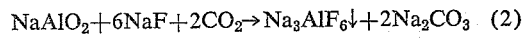
$NaAlO_2 + 6NaF + 4NaHCO_3$
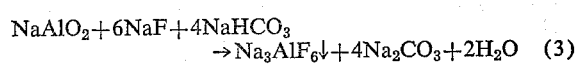
$$\rightarrow Na_3AlF_6\downarrow + 4Na_2CO_3 + 2H_2O \qquad (3)$$

The cost of the carbon dioxide or sodium bicarbonate required for this process will increase that of the recovered cryolite. Additional costs occur since the introduction of the carbon dioxide and the addition of the sodium bicarbonate to the reaction solution require appropriate auxiliary apparatus and the application of extra processing labor.

In the process according to the present invention, the expenses incurred by providing and adding carbon dioxide or sodium bicarbonate to the aluminate-fluoride solution are dispensed with because the waste-gas-washing process is so controlled that a sodium fluoride solution results which contains sufficient sodium bicarbonate to precipitate cryolite as shown in Equation 3.

According to the invention this is accomplished by circulating the sodium carbonate solution used for the neutralization of the hydrogen fluoride contained in the waste gases only long enough to convert the solution into sodium fluoride and sodium bicarbonate according to the following equation:

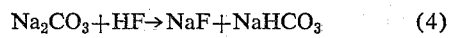
$$Na_2CO_3 + HF \rightarrow NaF + NaHCO_3 \qquad (4)$$

The reaction as per Equation 4 is only the first stage of the customary neutralization process illustrated by Equation 1. The second stage, eliminated in the process according to the present invention, corresponds to the reaction equation

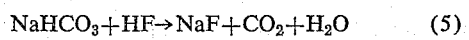
$$NaHCO_3 + HF \rightarrow NaF + CO_2 + H_2O \qquad (5)$$

I have found that it is possible to halt the neutralization process at the first stage of the reaction by maintaining the pH of the washing solution between substantially 9 and 12. The result is an equimolar solution of sodium fluoride and sodium bicarbonate, substantially all of the latter deriving from the reaction between the sodium carbonate and the gas.

A further advantage is the inherent speed of the process according to the invention since the reaction of Equation 4 is faster and more complete than that of Equation 5, and consequently more rapid and thorough than the reaction shown in Equation 1. This accelerated and thorough process of waste-gas washing and cryolite recovery considerably improves the efficiency of absorbing the hydrogen fluoride and, therefore, the yield of sodium fluoride from the absorption equipment as compared with the previously used processes.

In addition to the reaction according to Equation 4, which is essential for the recovery of fluorine compounds, the sodium carbonate reacts also with the carbon dioxide and sulfur dioxide contained in the waste gases during the waste-gas washing according to the following equations:

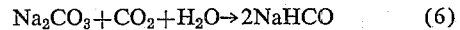
$$Na_2CO_3 + CO_2 + H_2O \rightarrow 2NaHCO \qquad (6)$$
$$NaCO_3 + SO_2 + \tfrac{1}{2}O_2 \rightarrow Na_2SO_4 + CO_2 \qquad (7)$$

The carbon bottom of an aluminum electrolytic furnace is comminuted by grinding. To this ground carbon bottom, containing cryolite, is added an excess (relative to the cryolite content) of dilute caustic soda lye. The insoluble matter is filtered off from the obtained aluminate liquor which then contains sodium fluoride.

The solution of sodium fluoride and sodium bicarbonate obtained by the reaction illustrated by Equation 4 is purified by the removal of suspended matter and is combined with the aluminate liquor obtained from the aforementioned treatment of the ground carbon bottom. Cryolite is precipitated, according to the reaction of Equation 3, and separated from the mother liquor, which contains soda, this mother liquor being then reused for neutralizing hydrogen fluoride which is contained in the waste gases.

The mother liquor resulting from the reaction illustrated by Equation 3 contains about 40 g./l. (grams per liter) or $Na_2CO_3$ and about 5 g./l. of NaF. (An excess of sodium fluoride was used for the cryolite precipitation.) This mother liquor is again subjected, in conventional gas-purifying apparatus, to the action of waste gases (containing hydrogen fluoride, $SO_2$ and $CO_2$) for a time just sufficient to convert the $Na_2CO_3$ to $NaHCO_3$, NaF and $Na_2SO_4$. Furthermore, during the washing of the gas, solid and liquid water-insoluble suspended substances, e.g. alumina and cryolite dust, soot and tar, are retained. These substances collect in the form of a suspension in the washing solution. In order to separate them, the washing solution, which carries these suspended substances, is circulated via a settling basin or a concentrator. The washing solution which is withdrawn from the circulation of the fluid of the gas-purifying apparatus and used for the precipitation of the cryolite contains about 32 g./l. sodium bicarbonate and 15 g./l. sodium fluoride. Only 10 g./l. of the latter have been newly added by the passage through the gas-purifying apparatus. The additional use of soda, arising on account of the incomplete utilization of the entire soda alkalinity, is compensated by the addition of sodium hydroxide from the lixiviation of the bottom carbon and by the free-alkali content of the lixiviated bottom carbon.

It has been found advantageous for the preparation of aluminate liquor, containing sodium fluoride, to treat crushed (or ground) carbon bottom with sodium hydroxide in an amount exceeding by about 30% the quantity theoretically necessary. A solution is prepared in another apparatus from ground bottom carbon and caustic soda lye which contains per liter about 26 grams sodium fluoride and 3 to 4 grams aluminum in the form of aluminate as well as the surplus sodium hydroxide used for the lixiviation which is increased by the free alkali contained in the lixiviated bottom carbon.

It is desirable to grind the carbon bottom and treat it with lye immediately after clearing away the furnace bottom in order to recover the free alkali which might be contained in this material, since a loss in the free-alkali content occurs during storage. This loss is brought about by contact with precipitation water (washing out) and by the effects of atmospheric carbon dioxide.

In a further embodiment of the instant invention, after lixiviating the carbon bottom with an excess of dilute caustic soda lye and separating the residue from the liquor (aluminate liquor which contains sodium fluoride), additional aluminate is prepared by adding aluminum, e.g. in the forms of turnings, foundry dross or aluminum compounds which are soluble in sodium hydroxide, to said liquor. Since the liquor contains an excess of sodium hydroxide, a reaction proceeds as follows:

$$2Al + 2NaOH + H_2O \rightarrow 2NaAlO_2 + 3H_2 \uparrow \quad (8)$$

The sodium-fluoride-containing aluminate liquor, which besides 26 grams NaF/l. contains now 7 to 8 grams Al/l., is suitably added in such an amount to the sodium fluoride-containing bicarbonate solution withdrawn from the gas-purifying apparatus that, after reaction, the mother liquor separated from the cryolite, having a pH of at most 12, still contains 10 to 30% of the obtained amount of sodium fluoride dissolved in the form of $Na_3AlF_6$. At such a mixing ratio the amount of sodium bicarbonate in the sodium fluoride-containing bicarbonate solution is in any case large enough to reduce the alkalinity of the solution mixture to the degree of alkalinity of the soda (pH about 12) and thereby to precipitate the cryolite.

The above-described process, as disclosed in my copending application Ser. No. 759,154 filed September 5, 1958, now abandoned, of which the present application is a continuation-in-part, achieves its greatest economic importance when it is carried out continuously. In such a continuous working process the four reaction systems are coupled and synchronized with one another. These four systems are:

(I) Waste-gas purification for the recovery of sodium fluoride and sodium bicarbonate as per Equation 4;
(II) The treatment of the carbon bottom with caustic soda lye, whereupon the following reaction takes place:

$$Na_3AlF_6 + 4NaOH \rightarrow 6NaF + NaAlO_2 + 2H_2O \quad (9)$$

(III) The enrichment of the aluminate content of the liquor produced by the reaction represented by Equation 9 by reacting aluminum with the excess sodium hydroxide in said liquor, according to Equation 8; and (IV) The precipitation of cryolite by reacting together the products of the reactions represented by Equations 4 and 8, 9, after the solids have been removed from these products, in accordance with Equation 3.

After the cryolite is separated from the product of the reaction represented by Equation 3, the remaining sodium carbonate liquor may be used, according to the reaction of Equation 4, to neutralize hydrogen fluoride in waste gases.

According to this invention the continuous performance of the four reaction systems noted above may be carried out in such a way that the bicarbonate solution (containing sodium fluoride) is separated from the suspended matter contained therein; the aluminate liquor (containing sodium fluoride) is filtered from the insoluble matter therein; the thus purified bicarbonate solution and aluminate liquor are continuously mixed; and the precipitated cryolite is thereafter removed from its mother liquor. The last-mentioned step may be accomplished by filtration.

Thus, the process consists of four partial processes which are logically interconnected, as described in greater detail below.

I. Waste-gas washing according to the equations:

(a) $Na_2CO_3 + HF \rightarrow NaHCO_3 + NaF$ (4)
(b) $Na_2CO_3 + CO_2 + H_2O \rightarrow 2NaHCO_3$ (6)
(c) $Na_2CO_3 + SO_2 + \frac{1}{2}O_2 \rightarrow Na_2SO_4 + CO_2$ (7)

The amount of $Na_2CO_3$ consumed according to the Equation 7, is to be attributed to the sulfur content of the anode mass and is a complete loss. The sodium sulfate is absorbed partially by the recovered cryolite. The remainder enriches the solutions which are present in the circulation and separates out as a precipitant at the bottom of the liquid when the limit of solubility is surpassed. As such it can be separated from the process solutions.

II. The leaching of the cryolite and of the aluminum compounds, both of which are soluble in NaOH, or of the metallic aluminum from the clearing of the carbon bottom by dilute caustic soda lye which is contained in the residue newly removed from the carbon bottom, and if necessary by additional free alkali, is accomplished according to the following reactions:

(d) $Na_3AlF_6 + 4NaOH \rightarrow 6NaF + NaAlO_2 + 2H_2O$ (9)
(e) $AlN + NaOH + H_2O \rightarrow NaAlO_2 + NH_3$ (10)
(f) $Al_4C_3 + 4NaOH + 4H_2O \rightarrow 4NaAlO_2 + 3CH_4$ (11)
(g) $2Al + 2NaOH + 2H_2O \rightarrow 2NaAlO_2 + 3H_2$ (8)

III. The enrichment of the aluminum content of the carbon-bottom lye by dissolving metallic aluminum, in the form of turnings, or metallic aluminum and aluminum nitride, in the form of foundry dross, in the NaOH present in excess in the carbon bottom takes place according to the equations:

(h) $2Al + 2NaOH + 2H_2O \rightarrow 2NaAlO_2 + 3H_2$ (8)
(i) $AlN + NaOH + H_2O \rightarrow NaAlO_2 + NH_3$ (10)

IV. Combinatoin of the so obtained solutions containing sodium fluoride, sodium bicarbonate, sodium sulfate, sodium aluminate, and possibly also surplus sodium hydroxide for the purpose of precipitating the cryolite and recovering the sodium carbonate for the waste-gas washing:

(j) $6NaF + NaAlO_2 + 4NaHCO_3$
$\rightarrow Na_3AlF_6 \downarrow + Na_2CO_3 + H_2O$ (3)
(k) $NaOH + NaHCO_3 \rightarrow Na_2CO_3 + H_2O$ (12)

Figure 1:
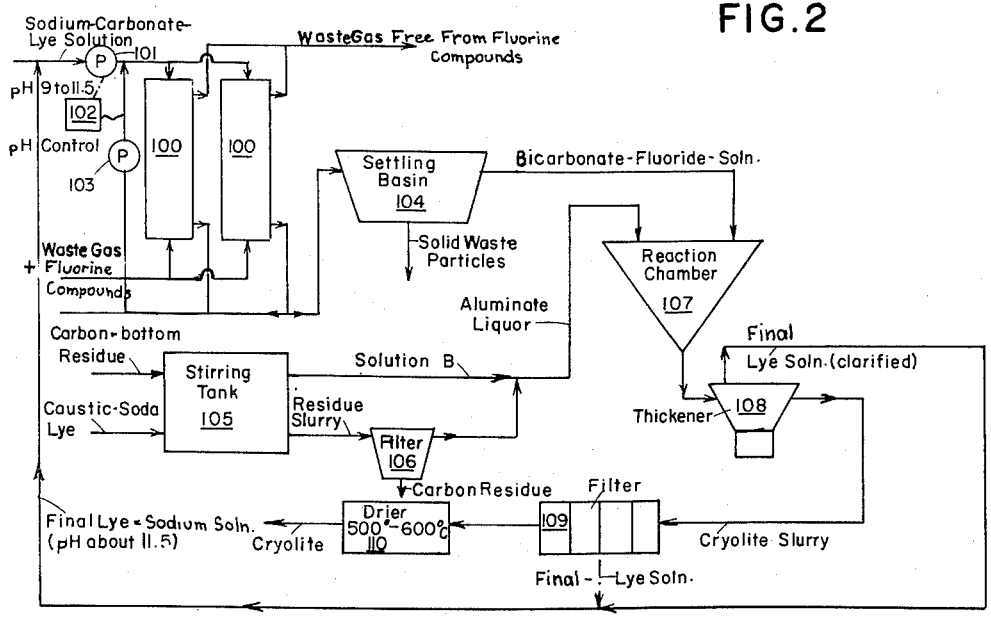

The invention is further illustrated, but not limited, by the following specific examples, reference being made to the accompanying drawing in which FIGS. 1 and 2 are flow diagrams of the processes of Examples 1 and 3, respectively.

*Example 1*

A final lye (solution C) of the cryolite precipitation with a pH of 11.5 containing

| | G./l. |
|---|---|
| $Na_2CO_3$ | 32.9 |
| $NaHCO_3$ | 6.6 |
| NaF | 3.3 |
| $Na_2SO_4$ | 27.0 | is used in wash towers 100 (FIG. 1) for the agitation of the furnace waste gases, of an aluminum electrolytic operation, flowing through these washers, whereby part of the water used as a solvent evaporates on account of the heat content of the waste gases to be purified and is continuously replaced by further additions of final lye via a pump 101, connected to the pH control unit 102, whenever the pH of the solution circulated by pump 103 decreases to 9.0; this solution A has the following composition:

| | G./l. |
|---|---|
| NaF(=7.1 g./l. F) | 15.6 |
| $Na_2CO_3$ | 12.5 |
| $NaHCO_3$ | 55.8 |
| $Na_2SO_4$ | 55.5 |

The solution which is contaminated by the pulverulent constituents from the furnace waste gases is separated from the same in a settling basin 104 and is then led into the cryolite-recovery installation.

Concurrently with this process an amount of 4500 kg. of carbon-bottom residue which has been ground in a ball mill to a fineness of grain of 0.1 mm. maximum, and which contains 12.5% NaOH-soluble F, 4.2% NaOH-soluble Al and 1.2% free alkali (as NaOH), is treated with 60 m.³ of a 1.5% caustic soda lye at 35° C. for 12 hours under constant stirring in a tank 105. The solution B resulting therefrom contains

| | G./l. |
|---|---|
| F as NaF | 9.4 |
| Al as $NaAlO_2$ | 3.2 |
| Free NaOH | 1.4 |

After the undissolved residue has deposited at the bottom of the reacting container, the largest part of the clear solution is decanted and thereupon the rest is separated by filtration on a revolving filter 106 from the residue. The residue containing up to 60% coke is used as fuel after drying (e.g. as described with reference to FIG. 2).

For the precipitation of the cryolite 50 m.³ each of the solutions A and B are mixed in a reaction chamber 107 and stirred for five hours. The resulting turbid liquid with 13.8 grams cryolite per liter is separated in a Dorr thickener 108 into a slurry with 350 grams cryolite per liter and the clarified final lye. The thickened cryolite is separated from residual final lye in a suction-cell filter 109 and is dried in a drum drier 110 at 500° to 600° C. until it contains a residual moisture of less than 1%. The cryolite consists approximately of

| | Percent |
|---|---|
| $Na_3AlF_6$ | 88.6 |
| $Na_2SO_4$ | 5.8 |
| $Na_2CO_3$ | 2.4 |
| $Al_2O_3$ | 0.6 |
| $SiO_2$ | 0.5 |
| Free C | 1.1 |
| $Fe_2O_3$ | 0.2 |
| $CaF_2$ | 0.2 |
| $H_2O$ | 0.8 |

The final lye, with a pH of 11.5 and an analysis of

| | G./l. |
|---|---|
| NaF | 3.3 |
| $NaHCO_3$ | 6.6 |
| $Na_2CO_3$ | 32.9 |
| and $Na_2SO_4$ | 27.0 | is led into the gas-washing towers 100 and is again reacted with the waste gases of the aluminum electrolyte furnace.

*Example 2*

In contradistinction to Example 1, the residue from the carbon bottom is here used for the production of solution B which in part has already been leached out by rain water upon prolonged storage in the open and therefore contains only 10.5% NaOH-soluble F, 2.5% NaOH-soluble Al and no free alkali.

5000 kg. of this carbon-bottom residue, ground as in Example 1, are lixiviated with 60 m.³ of a 2% caustic soda lye at 30° C. for ten hours in a stirring apparatus.

The solution B, which is separated from the lye residue as in Example 1, contains.

| | G./l. |
|---|---|
| F as NaF | 8.7 |
| Al as $NaAlO_2$ | 2.1 |
| and Free NaOH | 7.7 |

To this solution are gradually added in an agitator under gas suction 630 kg. ground foundry dross containing 33% NaOH-soluble Al in order to avoid foaming over of the vessel on account of the resulting admixture of hydrogen and ammonia during the reaction according to the Equations 8 and 10. Stirring is continued until the evolution of gas ceases completely. After cessation of the stirring the dross residue collects at the bottom. The clear fluid is then decanted and the deposit is freed from the adhering fluid on a suction filter, the fluid being then added to the decantate. The solution D obtained thereby contains

| | G./l. |
|---|---|
| F as NaF | 8.7 |
| Al as $NaAlO_2$ | 5.5 |
| and Free NaOH | 2.6 |

For the precipitation of the cryolite 50 m.³ of solution D are mixed with 150 m.³ of a solution from the waste-gas purification which contains

| | G./l. |
|---|---|
| NaF(=7.5 g./l. F) | 16.5 |
| $Na_2CO_3$ | 8.7 |
| $NaHCO_3$ | 41.6 |
| and $Na_2SO_4$ | 47.6 |

The precipitated cryolite is similar in composition to that derived according to Example 1 and is separated from the final lye, filtered and dried as mentioned in that Example. The final lye with a pH of 11.0 contains

| | G./l. |
|---|---|
| NaF | 4.4 |
| $NaHCO_3$ | 12.5 |
| $Na_2CO_3$ | 29.4 |
| and $Na_2SO_4$ | 35.0 | and is again used as washing fluid in the gas-purification apparatus.

*Example 3*

During the continuous performance of the process one withdraws continuously from the carbonate washing fluid circulated by pump 203 through the several parallel-working gas-washing devices 200 (as shown in FIG. 2) 8 liters per second of a solution of a pH 9.0 containing

| | G./l. |
|---|---|
| NaF(=5.7 g./l. F) | 12.6 |
| $Na_2CO_3$ | 12.5 |
| $NaHCO_3$ | 51.8 |
| and $Na_2SO_4$ | 58.5 | and replaces the so occurring losses of washing fluid, as well as the loss by evaporation, by final lye from the cryolite precipitation via pump 201.

One then leads the solution, which is continuously withdrawn and which carries along suspended substances from the wash towers 200, via a Dorr thickener 211 with a continuous slurry clearance to the first of the five series-connected agitators 212 to which flow simultaneously 8 liters per second of a carbon-bottom lye containing

| | G./l. |
|---|---|
| F as NaF | 11.5 |
| Al as NaAlO$_2$ | 3.5 |
| and | |
| Free NaOH | 1.2 |

The precipitation of the cryolite takes place while the mixture of the two components flows through the five vessels 212 with a velocity of flow of 16 liters per second. The fluid invariably enters the vessel at the top and leaves it at the point of its cone-shaped bottom, in order to rise in a pipe line (e.g. conduits 213, shown schematically) and to flow into the next-following vessel from the top. The turbid cryolite, flowing from the fifth vessel 212 at the same velocity of flow as the two components are supplied, is separated from the clear final lye in a Dorr thickener 214, the final lye returning at 15.5 liters per second to the gas-washing towers 200 and having the following analysis:

[pH=12.0]

| | G./l. |
|---|---|
| NaF | 2.6 |
| Na$_2$CO$_3$ | 35.4 |
| NaHCO$_3$ | 2.9 |
| Na$_2$SO$_4$ | 29.3 |

The cryolite thickened to a consistency of 300 grams solid mass per liter is freed from the residual final lye in a washing thickener 215.

The continuous preparation of the carbon-bottom lye used during the cryolite precipitation is accomplished as follows:

In the first of the three series-connected Dorr agitators 216 an amount of 800 grams per second of a ground carbon-bottom residue, as mentioned in Example 1, containing 11.5% NaOH-soluble F, 3.5% NaOH-soluble Al and 1.2% free NaOH, is continuously added from a hopper 217 by means of a dosing screw 218. Simultaneously caustic-soda lye of 1.7% NaOH flows into the first vessel 216 with a velocity of flow of 8 liters per second. The overflow of the third agitator flows into a thickener 219 in which the separation of the carbon-bottom lye from the lye residue takes place. The lye is used, as described above, for the cryolite precipitation, while from the lye residue the remainder of the lye is washed out in a centrifuge 220. The washing fluid is used as solvent for the preparation of the caustic-soda lye.

The coke-containing residue is used as fuel after dehydration in a drying drum 221.

The described continuous cryolite-recovery process has a yield of 900 kg. cryolite per hour having the following composition:

| | Percent |
|---|---|
| Na$_3$AlF$_6$ | 87.2 |
| Al$_2$O$_3$ | 2.1 |
| Na$_2$SO$_4$ | 5.2 |
| Na$_2$CO$_3$ | 2.8 |
| SiO$_2$ | 0.5 |
| Fe$_2$O$_3$ | 0.2 |
| CaF$_2$ | 0.2 |
| Free C | 0.5 |
| H$_2$O | 1.0 |

I claim:

1. A process for recovering fluorine, as cryolite, from the fluorine-containing waste gas and carbon bottom of an aluminum electrolytic furnace, comprising the steps of treating the waste gas with a solution of sodium carbonate of a concentration sufficient to remove at least a major portion of the fluorine from said gas, for a period just sufficient to form an alkaline first solution having a pH between substantially 9 and 12 and comprising substantially equimolar quantities of sodium fluoride and sodium bicarbonate, substantially all of said sodium bicarbonate in said first solution being derived from the reaction between said solution of sodium carbonate and said gas; comminuting the carbon bottom, treating the comminuted carbon bottom with a solution of sodium hydroxide to form a second solution comprising sodium aluminate and sodium fluoride, and filtering said second solution to remove suspended solid particles; and mixing said first solution with said second solution to precipitate cryolite.

2. A process according to claim 1 wherein said solution of sodium hydroxide comprises a quantity of sodium hydroxide at least 30% in excess of that required to convert the fluorine and aluminum contained in said carbon bottom into sodium fluoride and sodium aluminate, respectively.

3. A process according to claim 2, further comprising the step of adding aluminum to said second solution to produce a quantity of sodium aluminate in addition to that derived from said carbon bottom.

4. A process according to claim 1 wherein said carbon bottom is comminuted and treated with said solution of sodium hydroxide in substantially the condition in which it has been upon its removal from said furnace.

5. A process for recovering fluorine, as cryolite, from the fluorine-containing waste gas and the carbon bottom of an aluminum electrolytic furnace, comprising the steps of treating the waste gas with a solution of sodium carbonate of a concentration sufficient to remove at least a major portion of the fluorine from said gas, for a period just sufficient to form an alkaline first solution having a pH of substantially 9 to 12 comprising substantially equimolar quantities of sodium fluoride and sodium bicarbonate substantially all of said sodium bicarbonate in said first solution being derived from the reaction between said solution of sodium carbonate and said gas; comminuting the carbon bottom, treating the comminuted carbon bottom with a solution comprising sodium hydroxide at least 30% in excess of the quantity required to convert the fluorine and aluminum contained in said carbon bottom into sodium fluoride and sodium aluminate, respectively, to form a second solution comprising sodium aluminate and sodium fluoride, filtering said second solution to remove suspended solid particles, and adding aluminum particles to said second solution; and mixing said first solution with said second solution to precipitate cryolite.

6. A process for recovering fluorine, as cryolite, from the fluorine-containing waste gas and the carbon bottom of an aluminum electrolytic furnace, comprising the steps of treating the waste gas with a solution of sodium carbonate, of a concentration sufficient to remove at least a major portion of the fluorine from said gas for a period just sufficient to form an alkaline first solution having a pH between substantially 9 and 12 and comprising substantially equimolar quantities of sodium fluoride and sodium bicarbonate, substantially all of said sodium bicarbonate in said first solution being derived from the reaction between said solution of sodium carbonate and said gas; comminuting the carbon bottom, treating the comminuted carbon bottom with a solution comprising sodium hydroxide in excess of the quantity required to convert the fluorine and aluminum contained in said carbon bottom into sodium fluoride and sodium aluminate, respectively, to form a second solution comprising sodium aluminate and sodium fluoride, filtering said second solution to remove suspended solid particles, and adding a sodium hydroxide-soluble aluminate to said second solution; and mixing said first solution with said second solution to precipitate cryolite.

7. A continuous process for recovering fluorine, as cryolite, from the hydrogen fluoride-containing waste gas and the fluorine-containing carbon bottom of an aluminum electrolytic furnace, comprising the steps of continuously treating the waste gas with a solution of sodium carbonate, of a concentration sufficient to remove at least a major portion of the fluorine from said gas for a period sufficient to form an alkaline first solution having a pH between substantially 9 and 12 and comprising substantially equimolar quantities of sodium fluoride and sodium bicarbonate, substantially all of said sodium bicarbonate in said first solution being derived from the reaction between said solution of sodium carbonate and said gas; treating comminuted carbon bottom with a solution of sodium hydroxide to form a second solution comprising sodium aluminate and sodium fluoride; and continuously admixing a portion of said first solution with a portion of said second solution in a proportion sufficient to precipitate substantially all the sodium aluminate from both solutions as cryolite.

8. A process for the recovery of fluorine compounds from waste gases and from the carbon bottom of an aluminum electrolytic furnace which comprises the steps of neutralizing hydrogen fluoride in the waste gases with a sodium carbonate solution having a pH between substantially 9 and 12 and of a concentration sufficient to remove at least a major portion of the hydrogen fluoride from said gases and to form an alkaline first solution having a pH between substantially 9 and 12 and containing simultaneously sodium fluoride and sodium bicarbonate in substantially equimolar quantities substantially all of said sodium bicarbonate in said first solution being derived from the reaction between said solution of sodium carbonate and said gas; treating cryolite in the carbon bottom with caustic soda lye to form an aqueous second solution containing simultaneously sodium fluoride and sodium aluminate; and mixing together said first and second solutions whereby cryolite is precipitated.

9. A process for the recovery of fluorine compounds from waste gases and from the carbon bottom of an aluminum electrolytic furnace which comprises the steps of neutralizing hydrogen fluoride in the waste gases with a sodium carbonate solution of a concentration sufficient to remove at least a major portion of the hydrogen fluoride from said gases and to form an alkaline first solution having a pH between substantially 9 and 12 and containing simultaneously sodium fluoride and sodium bicarbonate in substantially equimolar quantities, substantially all of said sodium bicarbonate in said first solution being derived from the reaction between said solution of sodium carbonate and said gas; treating cryolite in the carbon bottom with an excess of caustic soda lye to form an aqueous second solution containing simultaneously sodium fluoride and sodium aluminate; increasing the aluminate content of said second solution by reacting aluminum with the excess caustic soda lye therein; and mixing together said first and second solutions whereby cryolite is precipitated.

References Cited in the file of this patent

UNITED STATES PATENTS

| | | |
|---|---|---|
| 1,871,723 | Morrow | Aug. 16, 1932 |
| 2,597,302 | Dale | May 20, 1952 |
| 2,714,053 | Albert et al. | July 26, 1955 |
| 2,813,000 | Quittenton | Nov. 12, 1957 |

FOREIGN PATENTS

| | | |
|---|---|---|
| 89,255 | Norway | May 20, 1957 |